US008825870B1

(12) United States Patent
Tawri et al.

(10) Patent No.: US 8,825,870 B1
(45) Date of Patent: Sep. 2, 2014

(54) TECHNIQUES FOR NON-DISRUPTIVE TRANSITIONING OF CDP/R SERVICES

(75) Inventors: Deepak Tawri, Sunnyvale, CA (US); Abhay Kumar Singh, Mountain View, CA (US); Raghu Krishnamurthy, Santa Clara, CA (US); Gopal Sharma, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 1023 days.

(21) Appl. No.: 11/771,608

(22) Filed: Jun. 29, 2007

(51) Int. Cl.
*G06F 15/16* (2006.01)
*G06F 15/173* (2006.01)
*G06F 15/177* (2006.01)
*G06F 15/167* (2006.01)
*G06F 12/00* (2006.01)

(52) U.S. Cl.
USPC ........... 709/227; 709/224; 709/220; 709/212; 711/162

(58) Field of Classification Search
USPC .................. 709/227, 224, 220, 212; 711/162
See application file for complete search history.

(56) References Cited

U.S. PATENT DOCUMENTS

| | | | |
|---|---|---|---|
| 2006/0064466 A1* | 3/2006 | Shiga et al. | 709/214 |
| 2006/0130052 A1* | 6/2006 | Allen et al. | 717/172 |
| 2007/0174721 A1* | 7/2007 | Yamamoto et al. | 714/42 |
| 2007/0239944 A1* | 10/2007 | Rupanagunta et al. | 711/147 |
| 2007/0263637 A1* | 11/2007 | Madnani et al. | 370/396 |
| 2007/0283186 A1* | 12/2007 | Madnani et al. | 714/6 |
| 2007/0300013 A1* | 12/2007 | Kitamura | 711/114 |
| 2008/0005507 A1* | 1/2008 | Madnani et al. | 711/161 |
| 2008/0082770 A1* | 4/2008 | Ahal et al. | 711/162 |

* cited by examiner

*Primary Examiner* — Viet Vu
*Assistant Examiner* — Herman Belcher
(74) *Attorney, Agent, or Firm* — Wilmer Cutler Pickering Hale and Dorr LLP

(57) ABSTRACT

Techniques for CDP/R services are disclosed. In one particular exemplary embodiment, the techniques may be realized as a method of transitioning continuous data protection and replication comprising determining whether a first appliance node connected to a switched fabric contains one or more transactions received from a host node, unregistering a world wide port name of a target port of the first appliance node, registering the world wide port name to a target port of a second appliance node connected to the switched fabric, associating one or more logical unit numbers of the second appliance node with the target port of the second appliance node, exporting the one or more logical unit numbers of the second appliance node, logging the target port of the second appliance node into a switched fabric, and logging the target port of the second appliance node into a remote node port of the host node.

18 Claims, 2 Drawing Sheets

TECHNIQUES FOR NON-DISRUPTIVE TRANSITIONING OF CDP/R SERVICES

FIELD OF THE DISCLOSURE

The present disclosure relates generally to data storage and replication, and, more particularly, techniques for non-disruptive transitioning of continuous data protection and replication (CDP/R) services.

BACKGROUND OF THE DISCLOSURE

Transitioning continuous data protection and replication (CDP/R) services from one CDP/R appliance node to another CDP/R appliance node in a cluster of appliance nodes in a manner that is not disruptive to application hosts relying on the CDP/R services is a significant challenge, but nevertheless desirable for several reasons. First, it may enable load balancing of CDP/R services in one or more clusters of appliance nodes. Secondly, it may allow the upgrade of a CDP/R appliance node without disrupting the services provided to one or more application hosts.

Currently, transitioning CDP/R services from a first appliance node to a second appliance node often requires disrupting input/output received from an application on a host node relying on the first appliance node until the host node is reconfigured to use the second appliance node. This produces a disruption in CDP/R services that is often unacceptable to many applications relying on CDP/R services.

Another approach would be to require a host node to have two or more paths from a host node to an appliance cluster and to use two or more separate appliance nodes for CDP/R services. This approach is expensive and very complex. This can be achieved using an Active/Passive configuration or an Active/Active Configuration. Either approach requires a dynamic multi-pathing (DMP) driver on the host node.

An Active/Passive configuration may involve one appliance node with an active path to the host and one or more appliance nodes with passive paths to the host. During failover a cluster controller of the appliance cluster must be notified by the host node of the new active path for the host. This requires extra coordination and software on the host. Additionally, there may be conflicts and performance degradation if more than one host node fails and tries to utilize the same appliance node. The resulting conflicts and coordination problems between hosts that may choose different paths to the same appliance node (i.e.—different ports but on the same host bus adapter of an appliance node) can result in severe performance degradation.

An Active/Active approach requires a host node to have two or more appliance nodes with active paths to the ports. It is very difficult to synchronize data writes across two or more appliance nodes. This approach also requires a distributed locking mechanism to be implemented amongst the various active nodes, which is not inherently scalable.

In view of the foregoing, it may be understood that there are significant problems and shortcomings associated with current methods of transitioning CDP/R services.

SUMMARY OF THE DISCLOSURE

Techniques for non-disruptive transitioning of continuous data protection and replication (CDP/R) services are disclosed. In one particular exemplary embodiment, the techniques may be realized as a method of transitioning continuous data protection and replication comprising determining whether a first appliance node connected to a switched fabric contains one or more transactions received from a host node, unregistering a world wide port name of a target port of the first appliance node, registering the world wide port name to a target port of a second appliance node connected to the switched fabric, associating one or more logical unit numbers of the second appliance node with the target port of the second appliance node, exporting the one or more logical unit numbers of the second appliance node, logging the target port of the second appliance node into a switched fabric, and logging the target port of the second appliance node into a remote node port of the host node.

In another particular exemplary embodiment, the techniques may be realized as an article of manufacture for transitioning continuous data protection comprising at least one processor readable carrier, and instructions carried on the at least one carrier, wherein the instructions are configured to be readable from the at least one carrier by at least one processor and thereby cause the at least one processor to operate so as to determine whether a first appliance node connected to a switched fabric contains one or more transactions received from a host node, unregister a world wide port name of a target port of the first appliance node, register the world wide port name to a target port of a second appliance node connected to the switched fabric, associate one or more logical unit numbers of the second appliance node with the target of the second appliance node, export the one or more logical unit numbers of the second appliance node, log the target port of the second appliance node into the switched fabric, and log the target port of the second appliance node into a remote node port of the host node.

In yet another particular exemplary embodiment, the techniques may be realized as a system for transitioning continuous data protection comprising one or more processors for determining whether a first appliance node connected to a switched fabric contains one or more transactions received from a host node, and one or more cluster controllers for controlling a cluster of appliance nodes, wherein the cluster controller is configured to unregister a world wide port name of a target port of the first appliance node, register the world wide port name to a target port of a second appliance node connected to the switched fabric, associate one or more logical unit numbers of the second appliance node with the target of the second appliance node, export the one or more logical unit numbers of the second appliance node, log the target port of the second appliance node into the switched fabric, and log the target port of the second appliance node into a remote node port of the host node.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
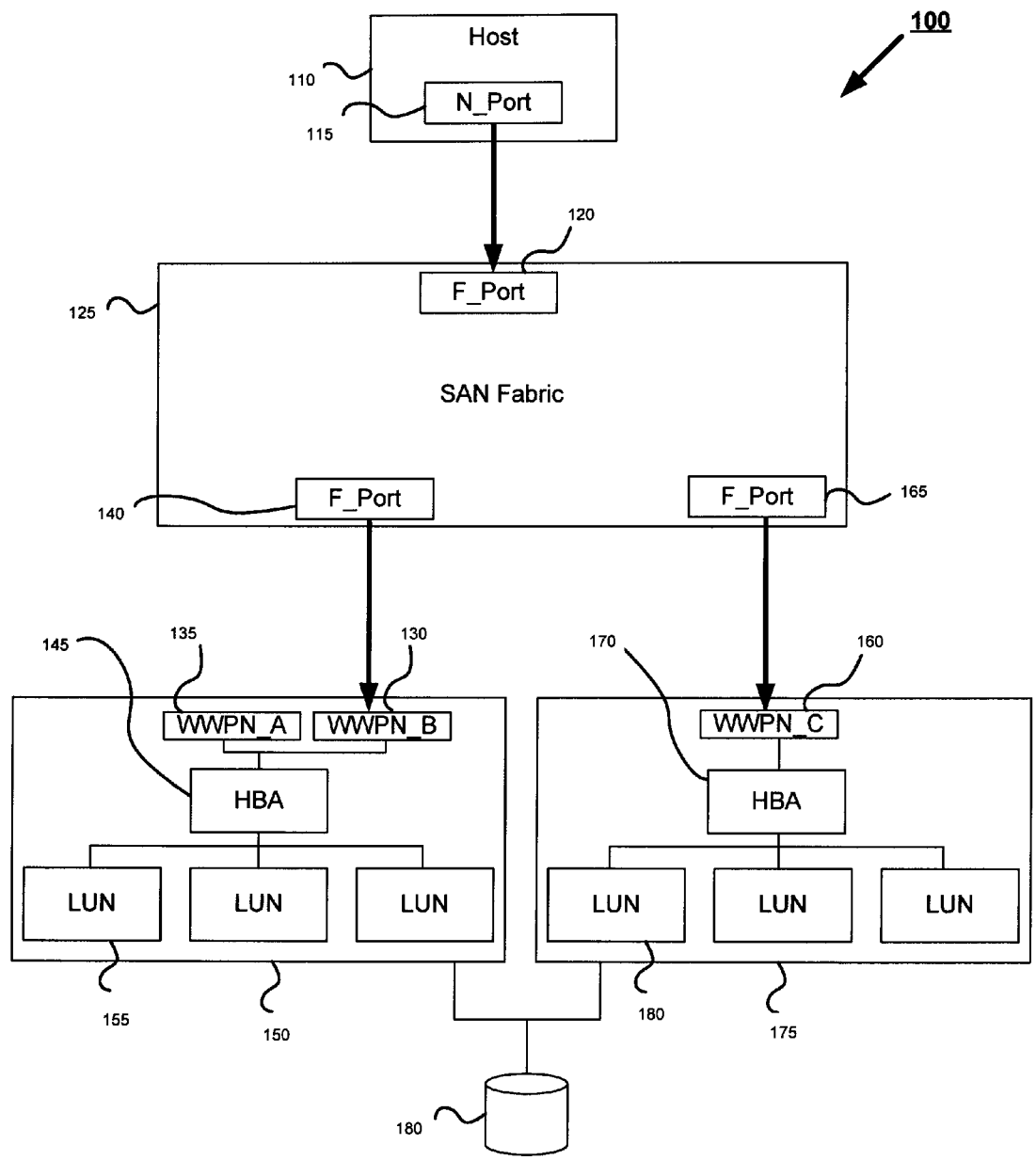
FIG. 1 shows a system of non-disruptive dynamic load balancing of continuous data protection and replication services in accordance with an embodiment of the present disclosure.

Referring to FIG. 1, there is shown a system 100 of non-disruptive transitioning of continuous data protection and replication services in accordance with an embodiment of the present disclosure. Host 110 may represent an application host using continuous data protection and replication services (CDP/R) from appliance node 150 via storage area network (SAN) fabric 125. Host 110 may contain one or more node ports (N_ports) 115 which may contain a link control facility (LCF) and may be capable of connecting to one or more fabric ports (F_ports) of SAN fabric 125. SAN fabric 125 may be a fibre channel switched fabric and may contain one or more fibre channel switches. F_port 120 may represent a port containing a link control facility (LCF) that N_port 115 is currently connected to. F_port 140 may represent a port connected to virtualized world wide port name WWPN_B 130 of host bus adapter (HBA) 145. WWPN_A 135 and WWPN_B 130 may represent virtualized or aliased world wide port names (WWPN) associated with an N_port of host bus adapter (HBA) 145. HBA 145 may be a host bus adapter providing access to one or more logical unit numbers (LUNs) 155 associated with appliance node 150. LUNs 155 may provide access to SAN storage. F_port 165 may represent a port connected to a virtualized world wide port name (WWPN) 160 of HBA 170. HBA 170 may be a host bus adapter providing access to one or more logical unit numbers (LUNs) 180 associated with appliance node 175. Appliance nodes 150 and 175 may access journal 180. Journal 180 may be a database, a log file or other storage.

World wide port names (WWPN) of a host bus adapter may be virtualized using N_Port identifier virtualization. World wide port names of a host bus adapter may also use multi-id aliasing or other techniques to allow a single fiber channel port (FCP) of a host bus adapter to be shared by more than one application. The aliased port identifier, virtualized port identifier or other N_port sharing technique may allow an N_Port identifier such as a virtualized world wide port name to be unregistered from a fiber channel port of a first appliance node and registered with a second appliance node. A fiber channel port of a host bus adapter on a first appliance node may contain a permanent world wide port name (WWPN). Aliasing or virtualizing the WWPN may enable an application on host 110 to maintain a connection to the aliased or virtualized WWPN and allow the WWPN to be migrated from a first node to a second node in a non-disruptive manner. For example, an application running on host 110 may be connected via N_Port 115 to F_port 120 of SAN fabric 125. F_port 120 may be connected to F_port 140. WWPN_B 130 may be logged into F_port 140. WWPN_B 130 may be a virtualized or aliased WWPN on HBA 145. WWPN_B 130 may provide access to LUNs 155. It may be desirable for continuous data protection and replication services to be transitioned from appliance node 150 to appliance node 175. Pending input/output (I/O) transactions of the application on host 110, which may be in memory of appliance node 150 but have not yet been written to storage, may be stored in journal 180. In one or more embodiments, pending input/output (I/O) transactions may be forwarded to a second appliance node for processing. In some embodiments, if pending input/output (I/O) transactions are detected, the transitioning from one appliance node to a second appliance node may wait for any pending input/output (I/O) transactions to be processed and may then resume once processing of the transactions is complete. WWPN_B 130 may be unregistered from HBA 145. WWPN_B 130 may be registered and bound to HBA 170 of appliance node 175. If the HBA 145 supports extended link services, it may explicitly logout of F_port 140. WWPN_B 130, which may now be associated with HBA 170, may perform a fabric login (FLOGI) and may login in to f-port 165 of SAN fabric 125. WWPN_B 130 may then perform a port login (PLOGI) to login with the remote node port of the Host 110. WWPN_B 130 may login with N_Port 115 of host 110. At this point, CDP/R services may be performed for host 110 by appliance node 175. This transition from CDP/R services of appliance node 150 to CDP/R services of appliance node 175 may occur in less time than a SCSI (small computer systems interface) timeout period. Thus, any I/O attempts by host 110 to WWPN_B 130 may be retried as part of the normal SCSI protocol and may resume without disruption to host 110. If there were any pending I/O transactions of appliance node 150, they may be read by appliance node 175 from journal 180 and processed.

Figure 2:
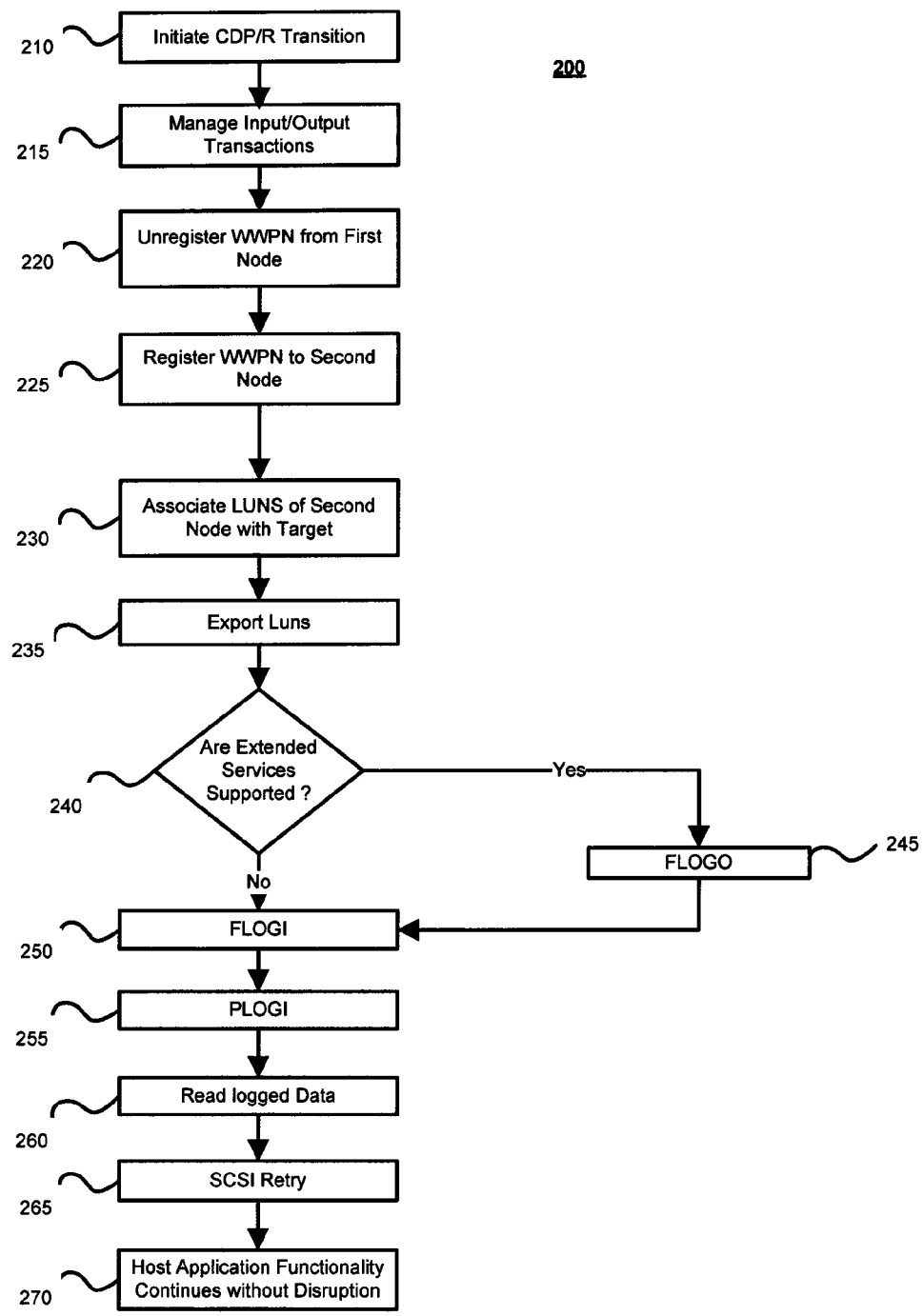
FIG. 2 shows a method of non-disruptive dynamic load balancing of continuous data protection and replication services in accordance with an embodiment of the present disclosure.

Referring to FIG. 2, there is shown a method of non-disruptive dynamic load balancing of continuous data protection and replication services in accordance with an embodiment of the present disclosure. At step 210, the transition of continuous data protection and replication (CDP/R) from a first appliance node to a second appliance node may begin. At step 215, it may be determined whether the first appliance node contains any pending input/output (I/O) transactions. One or more pending input/output transactions, received by a first appliance node from a host node but not yet processed, may be recorded to a log, a journal or other storage. In one or more embodiments, pending transactions may not be recorded and may be forwarded to a second appliance node to for processing. In some embodiments, if pending transactions are detected, the process may wait until the transactions are processed by the first node and may continue when no pending transactions are detected. There may be no pending transactions detected and the process may continue at step 220. At step 220, a world wide port name which is virtualized or aliased may be unregistered from a host bus adapter (HBA) of the first appliance node. At step 225, the virtualized world wide port name may be registered or bound with a host bus adapter (HBA) of the second node. At step 230, one or more logical unit numbers (LUNS) of the second appliance node may be associated with the target virtualized or aliased world wide port name (WWPN). At step 235, one or more logical unit numbers (LUNS) of the second appliance node may be exported. At step 240, it may be determined whether an N_Port of the first appliance node to which the WWPN was associated supports extended link services. If it does, the method may continue at step 245. At step 240, if the N_Port does not support extended link services, the next time the N_Port logs in, it may cause an implicit logout of the prior session. If the N_Port does not support extended link services, the method may continue at step 250. At step 250, an N_Port of the second appliance node may perform a fabric login (FLOGI) and may be logged in to a SAN fabric. At step 255, the N_Port of the second appliance node may perform a port login (PLOGI) and may log in to a remote port of the host node. At this point, continuous data protection and replication (CDP/R) services may resume. One or more of steps 210 through 255 may occur prior to a SCSI timeout value and may thus transition CDP/R services from a first appliance node to second appliance node without disruption to a host node. At step 260, the second appliance node may read one or more pending input/output transactions of the first appliance node from a journal, a log file, a database or other storage. The second appliance node may then process the transactions. At step 265, a SCSI retry may occur and the host node may resume CDP/R services from the second appliance node. At step 270, the host application functionality may resume without disruption.

Transitioning continuous data protection and replication (CDP/R) services may be performed for one or more reasons. Transitioning CDP/R services may be performed to facilitate dynamic load balancing and may enable the transitioning of CDP/R services from a heavily utilized appliance node in a cluster to an appliance node with more capacity. CDP/R services may be transitioned in response to a degraded application performance of an application on a host node. CDP/R services may be transitioned manually by an administrator or other personnel monitoring performance. In some embodiments, CDP/R services may be transitioned automatically by a performance monitoring tool that may be monitoring CDP/R appliance nodes in a cluster. CDP/R services may be transitioned in response to a number of input/output operations on an appliance node, a number of snapshots in memory on an appliance node, an application priority metric, a service level agreement (SLA) metric, memory consumption of an appliance node, processor utilization of an appliance node, or other performance metrics. In one or more embodiments, CDP/R services may be transitioned from a first appliance node to a second appliance node in order to enable a first appliance node to be upgraded, repaired, moved or otherwise accessed in a manner that may be disruptive to users of CDP/R services from the first node.

At this point it should be noted that non-disruptive dynamic load balancing of continuous data protection and replication (CDP/R) services in accordance with the present disclosure as described above typically involves the processing of input data and the generation of output data to some extent. This input data processing and output data generation may be implemented in hardware or software. For example, specific electronic components may be employed in an appliance node, fibre channel switch, or similar or related circuitry for implementing the functions associated with non-disruptive dynamic load balancing of continuous data protection and replication (CDP/R) services in accordance with the present disclosure as described above. Alternatively, one or more processors operating in accordance with stored instructions may implement the functions associated with non-disruptive dynamic load balancing of continuous data protection and replication (CDP/R) services in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer implemented method of transitioning continuous data protection and replication from a first appliance node to a second appliance node comprising:
  identifying a need for a transition from the first appliance node to the second appliance node;
  determining, using at least one computer processor, in response to the identification of the need, whether the first appliance node connected to a switched fabric contains one or more transactions received from a host node but not yet processed by the first appliance node;
  processing each of the one or more transactions not yet processed by the first appliance node to ensure that a non-disruptive transitioning of continuous data protection and replication from the first appliance node to the second appliance node is provided, wherein processing comprises:
    recording each of the one or more transactions not yet processed by the first appliance node to storage shared by the first appliance node and the second appliance node; and
    processing each of the one or more transactions by the second appliance node, wherein processing each of the one or more transactions by the second appliance node occurs without disruption of services to the host node;
  unregistering a world wide port name of a target port of the first appliance node;
  registering the world wide port name to a target port of the second appliance node connected to the switched fabric;
  associating one or more logical unit numbers of the second appliance node with the target port of the second appliance node, wherein the one or more logical unit numbers of the second appliance node are different from logical unit numbers of the first appliance node;
  exporting the one or more logical unit numbers of the second appliance node;
  logging the target port of the second appliance node into the switched fabric; and
  logging the target port of the second appliance node into a remote node port of the host node;
  wherein uninterrupted continuous data protection and replication services are provided to the host node during a transition from the first appliance node to the second appliance node, wherein the world wide port name is at least one of virtualized and aliased, and wherein the transitioning of continuous data protection and replication from the first appliance node to the second appliance node is initiated automatically by a performance monitoring tool.

2. The computer implemented method of claim 1 wherein the transitioning of continuous data protection and replication from the first appliance node to the second appliance node is initiated and completed before a SCSI timeout of a write operation to the first node.

3. The computer implemented method of claim 1 wherein the transitioning of continuous data protection and replication from the first appliance node to the second appliance node is initiated to enable an upgrade of the first appliance node.

4. The computer implemented method of claim 1 wherein the transitioning of continuous data protection and replication from the first appliance node to the second appliance node is initiated to improve load balancing in a cluster of appliance nodes.

5. The computer implemented method of claim 1 wherein the transitioning of continuous data protection and replication from the first appliance node to the second appliance node is initiated in response to degraded application input/output performance.

6. The computer implemented method of claim 1 wherein the transitioning of continuous data protection and replication from the first appliance node to the second appliance node is initiated in response to memory consumption of an appliance node.

7. The computer implemented method of claim 1 wherein the switched fabric is a fibre channel protocol switched fabric using N_port identifier virtualization.

8. The computer implemented method of claim 1 wherein the switched fabric is a fibre channel protocol switched fabric using multi-id aliasing.

9. A non-transitory article of manufacture for transitioning continuous data protection and replication from a first appliance node to a second appliance node comprising:
  at least one processor readable storage medium; and
  instructions stored on the at least one storage medium;
  wherein the instructions are configured to be readable from the at least one storage medium by at least one processor and thereby cause the at least one processor to operate so as to:
    identify a need for a transition from the first appliance node to the second appliance node;
    determine, in response to the identified need, whether a first appliance node connected to a switched fabric contains one or more transactions received from a host node but not yet processed by the first appliance node;
    process each of the one or more transactions not yet processed by the first appliance node to ensure that a non-disruptive transitioning of continuous data protection and replication from the first appliance node to the second appliance node is provided, wherein processing comprises:
      recording each of the one or more transactions not yet processed by the first appliance node to storage shared by the first appliance node and the second appliance node; and
      processing each of the one or more transactions by the second appliance node, wherein processing of the one or more secondary transactions occurs without disruption of services to the host node;
    unregister a world wide port name of a target port of the first appliance node;
    register the world wide port name to a target port of the second appliance node connected to the switched fabric;
    associate one or more logical unit numbers of the second appliance node with the target of the second appliance node, wherein the one or more logical unit numbers of the second appliance node are different from logical unit numbers of the first appliance node;
    export the one or more logical unit numbers of the second appliance node;
    log the target port of the second appliance node into the switched fabric; and
    log the target port of the second appliance node into a remote node port of the host node;
  wherein uninterrupted continuous data protection and replication services are provided to the host node during a transition from the first appliance node to the second appliance nod, wherein the world wide port name is at least one of virtualized and aliased, and wherein the transitioning of continuous data protection and replication from the first appliance node to the second appliance node is initiated automatically by a performance monitoring tool.

10. A system for transitioning continuous data protection and replication from a first appliance node to a second appliance node comprising:
  one or more processors for identifying a need for a transition from the first appliance node to the second appliance node and determining in response to the identified need, whether the first appliance node connected to a switched fabric contains one or more transactions received from a host node but not yet processed by the first appliance node, the one or more processors configured to process each of the one or more transactions not yet processed by the first appliance node to ensure that a non-disruptive transitioning of continuous data protection and replication from the first appliance node to the second appliance node is provided, wherein processing comprises:
    recording each of the one or more transactions not yet processed by the first appliance node to storage shared by the first appliance node and the second appliance node; and
    processing each of the one or more transactions by the second appliance node, wherein processing of the one or more secondary transactions occurs without disruption of services to the host node; and
  one or more cluster controllers for controlling a cluster of appliance nodes, wherein the cluster controller is configured to:
    unregister a world wide port name of a target port of the first appliance node;
    register the world wide port name to a target port of the second appliance node connected to the switched fabric;
    associate one or more logical unit numbers of the second appliance node with the target of the second appliance node, wherein the one or more logical unit numbers of the second appliance node are different from logical unit numbers of the first appliance node;
    export the one or more logical unit numbers of the second appliance node;
    log the target port of the second appliance node into the switched fabric; and
    log the target port of the second appliance node into a remote node port of the host node;
  wherein uninterrupted continuous data protection and replication services are provided to the host node during a transition from the first appliance node to the second appliance node, wherein the world wide port name is at least one of virtualized and aliased, and wherein the transitioning of continuous data protection and replication from the first appliance node to the second appliance node is initiated automatically by a performance monitoring tool.

11. The system of claim 10 wherein the transitioning of continuous data protection and replication from the first appliance node to the second appliance node is initiated in response to one of the following:
  to enable an upgrade of the first appliance node, a number of input/output operations on an appliance node, a number of snapshots in memory on an appliance node, an application priority metric, a service level agreement metric, memory consumption of an appliance node, to improve load balancing in a cluster of appliance nodes, or processor utilization of an appliance node.

12. The system of claim 10 wherein the switched fabric is a fibre channel protocol switched fabric using one of N_port identifier virtualization or multi-id aliasing.

13. The computer implemented method of claim 1, wherein the transitioning of continuous data protection and replication from the first appliance node to the second appliance node is initiated in response to a number of input/output operations on an appliance node.

14. The computer implemented method of claim 1, wherein the transitioning of continuous data protection and replication from the first appliance node to the second appliance node is initiated in response to a number of snapshots in memory on an appliance node.

15. The computer implemented method of claim 1, wherein the transitioning of continuous data protection and replication from the first appliance node to the second appliance node is initiated in response to an application priority metric.

16. The computer implemented method of claim 1, wherein the transitioning of continuous data protection and replication from the first appliance node to the second appliance node is initiated in response to a service level agreement metric.

17. The computer implemented method of claim 1, wherein the transitioning of continuous data protection and replication from the first appliance node to the second appliance node is initiated in response to processor utilization of an appliance node.

18. The computer implemented method of claim 1, wherein recording each of the one or more transactions not yet processed by the first appliance node to storage shared by the first appliance node and the second appliance node comprises recording the one or more transactions in a database.

* * * * *